United States Patent
Kho et al.

(10) Patent No.: US 8,855,281 B2
(45) Date of Patent: Oct. 7, 2014

(54) SYSTEMS FOR RETRIEVING CONTENT IN A UNIFIED COMMUNICATIONS ENVIRONMENT

(75) Inventors: Nancy Ellen Kho, Belmont, MA (US); Chen Zhang, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 13/491,666

(22) Filed: Jun. 8, 2012

(65) Prior Publication Data

US 2013/0329876 A1   Dec. 12, 2013

(51) Int. Cl.
*H04M 1/56* (2006.01)
*H04M 15/06* (2006.01)

(52) U.S. Cl.
USPC ............... 379/142.04; 379/142.1; 455/415

(58) Field of Classification Search
CPC ............ H04M 1/27; H04M 1/274508; H04M 1/274558; H04M 1/274583
USPC ............ 379/142.01–142.18, 207.14; 455/415
See application file for complete search history.

(56) References Cited

U.S. PATENT DOCUMENTS

| | | | |
|---|---|---|---|
| 6,408,065 B1 | 6/2002 | O'Neil et al. | |
| 6,681,004 B2 | 1/2004 | Strubbe et al. | |
| 6,873,692 B1 * | 3/2005 | Silver et al. | 379/142.17 |
| 7,505,572 B2 | 3/2009 | McCullough et al. | |
| 7,693,272 B2 | 4/2010 | Klein | |
| 7,817,790 B2 | 10/2010 | Sanmugasuntharam et al. | |
| 2004/0042594 A1 | 3/2004 | Sakata et al. | |
| 2005/0065959 A1 | 3/2005 | Smith et al. | |
| 2005/0130631 A1 * | 6/2005 | Maguire et al. | 455/414.1 |
| 2006/0010379 A1 * | 1/2006 | Kashi | 715/531 |
| 2006/0025112 A1 * | 2/2006 | Hamanaga et al. | 455/412.1 |
| 2007/0086133 A1 * | 4/2007 | Loucks et al. | 361/84 |
| 2007/0098013 A1 * | 5/2007 | Brown et al. | 370/466 |
| 2009/0203361 A1 | 8/2009 | Huang et al. | |
| 2011/0026698 A1 * | 2/2011 | Kuhlke et al. | 379/142.04 |
| 2011/0119230 A1 | 5/2011 | Zuber | |
| 2011/0159854 A1 * | 6/2011 | Kedefors et al. | 455/414.1 |
| 2012/0008756 A1 * | 1/2012 | Arsenault et al. | 379/142.17 |
| 2013/0331074 A1 | 12/2013 | Kim | |

OTHER PUBLICATIONS

Non-Final Office Action in related U.S. Appl. No. 13/886,443, mailed on Apr. 1, 2014; 9 pages.

* cited by examiner

*Primary Examiner* — Quoc D Tran
(74) *Attorney, Agent, or Firm* — Schmeiser, Olsen & Watts LLP

(57) ABSTRACT

Described are a system and method for processing content in a unified communications environment. As part of an electronic communication session between a first party electronic device and at least one second party electronic device, an identifier is received from the first party electronic device at the at least one second party electronic device. A search is performed for collaborative history data at the second party electronic device using the identifier. Data related to the electronic communication session and/or the collaborative history data is presented at the second party electronic device.

8 Claims, 6 Drawing Sheets

| Communications with David | | |
|---|---|---|
| Time | Type | Preview |
| 2 days ago | Voicemail | This is David. I am... |
| 10 days ago | Chat | What is the deadline... |
| 11 days ago | Word doc | Proposal.pdf Author: David Smith |

SYSTEMS FOR RETRIEVING CONTENT IN A UNIFIED COMMUNICATIONS ENVIRONMENT

FIELD OF THE INVENTION

The present invention relates generally to unified communications environments.

BACKGROUND

Unified communications provide users with call management features that can be performed at a computer. For example, when a call is made to a user's telephone, the user can receive a call notification, an email message, and the like at the user's computer. During the call, the user can independently search the computer for files, email messages, or other information for use during the call.

BRIEF SUMMARY

In one aspect, provided is a computer-implemented method, comprising: as part of an electronic communication session between a first party electronic device and at least one second party electronic device, receiving an identifier from the first party electronic device at the at least one second party electronic device; searching for collaborative history data at the at least one second party electronic device using the identifier; and presenting at least one of data related to the electronic communication session and the collaborative history data at the at least one second party electronic device.

In another aspect, provided is a device for unified communications, comprising: a call processor that processes an identifier received from a communication between a first party electronic device and at least one second party electronic device to determine a set of collaborative history data; a tag generation module that associates the identifier with at least one of data related to the communication and the set of collaborative history data; and an organization module that generates a list of items made available to at least one of the first party electronic device and the at least one second party electronic device.

In another aspect, provided is a computer program product comprising a computer readable storage medium having computer readable program code embodied therewith. The computer readable program code comprises computer readable program code configured to receive, as part of an electronic communication session between a first party electronic device and a second party electronic device, an identifier from the first party electronic device to the least one second party electronic device an identifier from the first party electronic device to the least one second party electronic device in the electronic communication session; computer readable program code configured to search for collaborative history data at the at least one second party electronic device using the identifier; and computer readable program code configured to present at least one of data related to the electronic communication session and the collaborative history data at the at least one second party electronic device.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 6 is a screenshot illustrating a summary of content displayed at a screen, in accordance with an embodiment.

DETAILED DESCRIPTION

Figure 1:
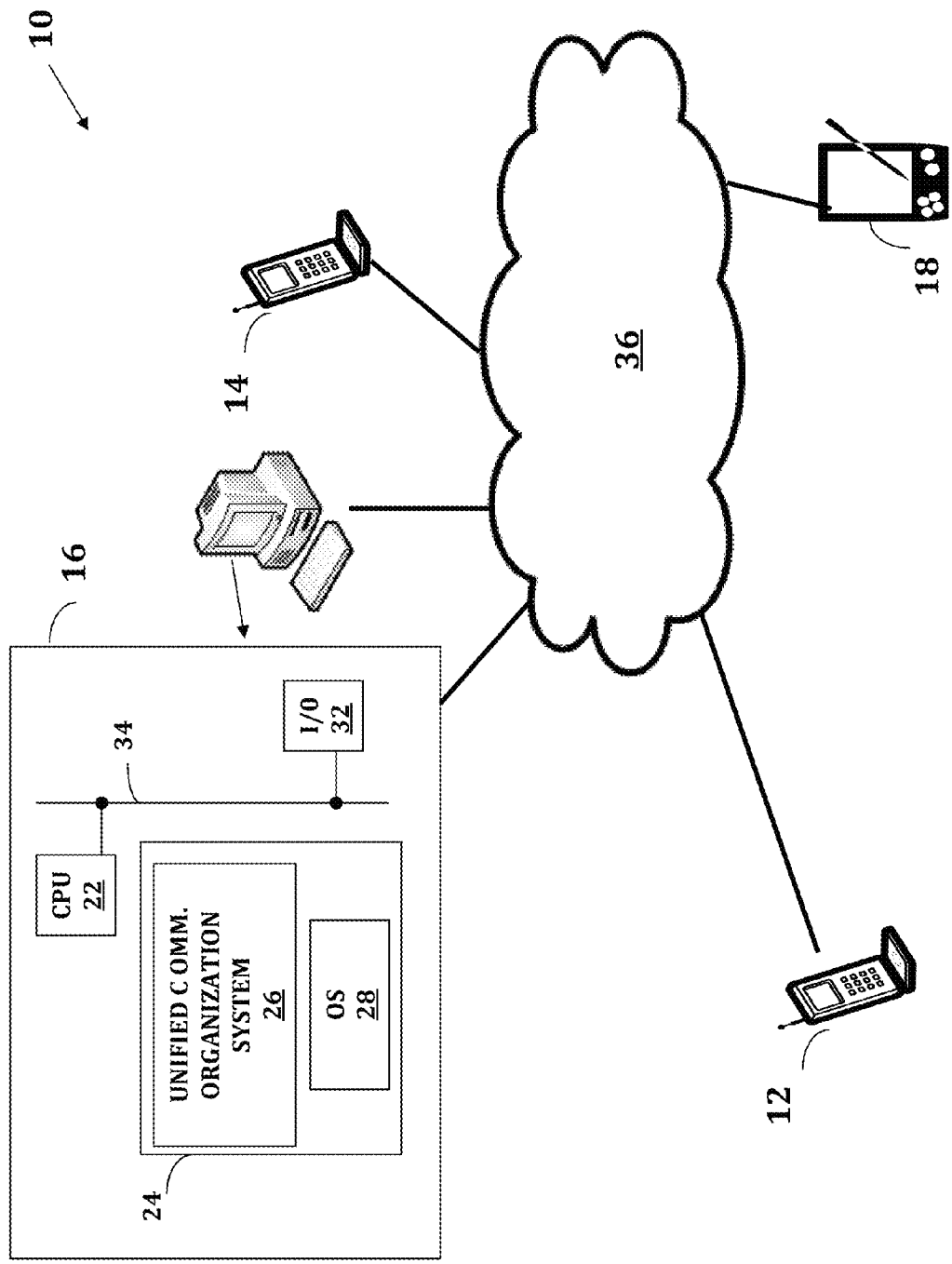
FIG. 1 is an illustration of a unified communications environment in which embodiments of the present inventive concepts can be practiced.

In the following description, specific details are set forth although it should be appreciated by one of ordinary skill that the systems and methods can be practiced without at least some of the details. In some instances, known features or processes are not described in detail so as not to obscure the present invention.

The systems and methods of the present inventive concepts provide a unified communications environment, where a telephone call or other communication from a calling party can be received at a called party's telephone, computer, and/or other electronic device, which triggers the presentation of a set of files, email messages, instant messaging chat transcripts, or other data associated with previous communications between the calling party and the called party. During each collaborative communication between the calling party and the called party, any files, messages, or other data accessed by the called party can be tagged for possible retrieval during future communications with the calling party. Similarly, data accessed by the calling party can be tagged for future identification. Relevant files or other data can be tagged before, during, and/or after a communication between the parties. For example, online chatting sessions, voicemails, and emails exchanged before, during, and/or after a communication can be tagged as being associated with the communication. Accordingly, the tagged items can be deemed relevant and can be stored as collaborative history data for future retrieval. In a subsequent communication between the parties, the collaborative history data can be identified by comparing an identifier provided in the communication with the header or metadata information in the tagged data items. In this manner, data such as relevant files or other data resources tagged during previous phone calls, chats, emails, or related communications can be displayed for the called party and/or the calling party during a current communication, thereby reducing the time needed by the user to search the computer for a relevant document during the call.

For example, modern technologies including electronic communications permit a company employee to call his supervisor at the supervisor's telephone to discuss a proposal previously emailed from the employee to his supervisor. A typical situation involves the supervisor performing a time-consuming search of her email directory for the proposal after receiving the employee's phone call, even where unified messaging is present between the supervisor's phone and computer.

In accordance with embodiments of the present inventive concepts, the employee's phone number, name, or other identifier is recognized by the supervisor's computer, which in response automatically searches for, and sorts, collaborative history data corresponding to previous communications between the employee and his supervisor, for example, emails, text messages, instant messaging sessions, and/or phone calls. Using the previous example, the present inventive concepts permit email containing the proposal to be presented to the supervisor among the collaborative history data results, since the email is identified and read, and the proposal accessed, in a previous communication with the employee.

Accordingly, the systems and methods of the present inventive concepts can analyze all data at a computer that is related to previous communications between two or more parties. The data can include email messages, files accessed during previous phone calls, chat scripts, and so on. The results of the data analysis can be presented to the user during a current communication, for example, a phone call, with the other party.

In another example, a team of customer service agents may participate in a weekly conference call to review all of the help tickets that were generated in a given week. In a typical conference call, each agent may receive in advance email messages include attachments, each including a help ticket report, which is opened by the agent during the call. Every week prior to a current conference call, an email message containing a set of ticket reports is sent from an email address report@acme.com to the participants, i.e., agents. When a participant agrees to participate in the conference call, for example, accepting the conference call, the previous help ticket reports discussed in one or more previous weekly calls can be retrieved. In addition, the latest email with the current ticket reports sent from report@acme.com can be retrieved, since the present inventive concepts automatically associates the email sender, i.e., report@acme.com, with the conference call phone number given if previous conference calls during which the participant accessed the email from this sender.

In another example, two computer users can exchange email messages or participate in an instant messaging (IM) exchange regarding a product design and then agree to talk over the phone, or by a different form of collaboration such as a video conference or online chat session. The present inventive concepts can associate the previous collaboration, i.e., email messages or IM exchange, with the phone call.

Accordingly, the present inventive concepts are not limited to files opened during previous phone calls. Other types of actions can also be associated with other users. For example, if, while on a call with a friend, a computer user can place her friend on hold and call another friend. The conversation recording with the other friend can be saved and tagged, generating an association with both friends. The tagged recording can be identified as a relevant document in a future call with either friend. Files uploaded or downloaded to the computer user before, during, or after the call can also be tagged as being associated with the person.

Communications between parties other than a user can nevertheless be associated with the user. For example, if a user engages in an electronic instant messaging or chat session with a first colleague a work-related task, and a second colleague is mentioned during the conversation, the chat transcript can be associated with not only the first colleague, but also the second colleague. The present inventive concepts permit the user to tag an item so that it is associated with another user, so that it can be brought up in a future call with the other user. Similar, the user can untag an item so that it is not associated with another user so that the item is not presented in a future call with the other user.

FIG. 1 is an illustration of a unified communications environment 10 in which embodiments of the present inventive concepts can be practiced.

The unified communications environment 10 permits one or more types of electronic communication to occur between different users, including but not limited to phone, data, video, or a combination thereof.

Each user in the unified communications environment 10 can have one or more electronic devices in communication with each other via a network 36, for example, a public switched telephone network (PSTN), a mobile communications network, a data network, such as a local area network (LAN) or wide area network (WAN), or a combination thereof, or other communication networks known to those of ordinary skill in the art. The electronic devices can include, but not limited to, a phone 12 of a first user, a phone 14 and a computer 16 of a second user, and/or a smartphone 18 of a third user. The phones 12, 14 can be telephones, cellphones, smartphones, and the like. The computer 16 can be a laptop computer, handheld device such as a personal digital assistant (PDA) or smartphone, a computer terminal, a tablet, or a combination thereof, or other electronic device having a display screen that presents screen sharing contents to a viewer. Any of the electronic devices 12, 14, 16, 18 can generate and/or receive one or more types of electronic communication.

The electronic devices 12, 14, 16, 18 can be geographically separate from each other, and can communicate with each other and/or with a unified communications (UC) organization system 26 via a network 36. The UC organization system 26 and/or one or more electronic devices 12, 14, 16, 18 can also communicate with one or more information sources, for example, email servers, data repositories, and/or internet chat rooms.

In an embodiment, the UC organization system 26 is part of a separate hardware platform than the electronic devices 12, 14, 16, 18. In other embodiments, the UC organization system 26 is constructed and arranged at one or more electronic devices, for example, the computer 16 of the second user. Regardless of the location of the UC organization system 26, the system 26 is constructed and arranged at a device that includes a processor such as the computer platform 16, which can include having a CPU 22, a memory 24, and an input/output (I/O) logic 32, e.g., a network interface card (NIC), which communicate with each other via a data/control bus and/or data connector, for example, a peripheral component interconnect (PCI) bus. The I/O logic 32 can include one or more adaptors for communicating with the network 36. The memory 24 can include volatile memory, for example, random access memory (RAM) and the like, and/or non-volatile memory, for example, read-only memory (ROM), flash memory, and the like. The memory 24 can include removable and/or non-removable storage media implemented in accordance with methods and technologies known to those of ordinary skill in the art for storing data. Stored in the memory 24 can include program code, such as program code of an operating system (OS) 28 and the UC organization system 26 executed by the processor 22.

The UC organization system 26 is accessible for organizing and retrieving relevant information at a user computer or related electronic device during an electronic communication such as a phone call without manual intervention by the user. For example, when the second user at the phone 14 receives a call from the first user phone 12, the second user does not need to put the call on hold in order to search the second user computer 16 for a file to be discussed during the call.

To achieve this, the UC organization system 26 generates a tag that is applied to any relevant information accessed by the second user during the current call, and during any previous communications with the first user, for example, email messages, IM chats, phone calls, and so on. A collaborative history comprising data used during previous communications and subsequently tagged can be provided to the second user computer 16 in a current communication. This "relevant information" can be anything at the second user computer 16. For example, files, programs, applications, etc., that are opened, edited, transferred, or otherwise accessed by the second user related to any communication with the first user phone 12. This can include websites visited via an internet browser. For example, during a previous call, the second user computer 16 can receive a proposal from the first user. The second user can save the proposal in a directory stored at the second user computer 16. In a subsequent call between the first and second users, the first user wants to discuss the proposal. Even if the second user cannot remember the directory where the proposal is stored, the proposal can automatically be presented at the computer screen, preventing the second user from performing a time-consuming search for the proposal.

The present inventive concepts handle relevant information differently than a call center. In a call center, the representative needs to manually upload file/attachment to a call log which will be sorted in a remote data location. The present inventive concepts on the other hand do not require a user to take any special steps to maintain the relevant information, since the actual file remains at its directory without change.

Figure 2:
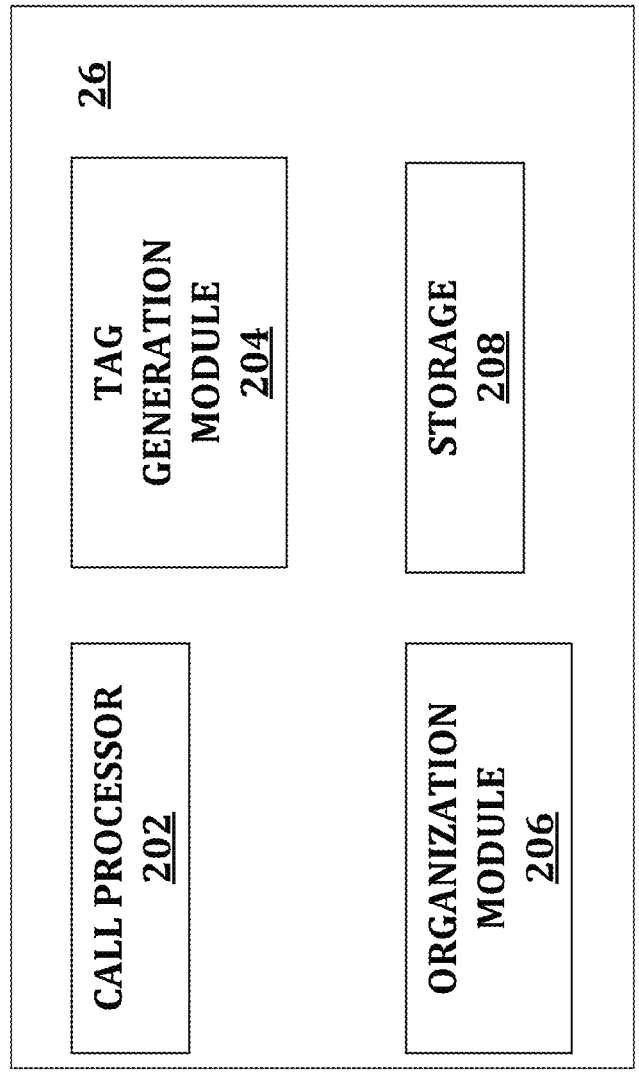
FIG. 2 is a block diagram of a unified communications (UC) organization system, in accordance with an embodiment.

FIG. 2 is a block diagram of a UC organization system 26, in accordance with an embodiment. The UC organization system 26 can include a call processor 202, a tag generation module 204, an organization module 206, and a storage device 208. The call processor 202, the tag generation module 204, the organization module 206, and the storage device 208 can be at a same hardware platform, or at different devices. For example, the storage 208 can be at the user computer 16 and the call processor 202, the tag generation module 204, and the organization module 206 can be at a remote computer platform (not shown).

The call processor 202 processes an identifier, for example, a calling party ID and the like, received from an incoming communication, for example, a phone call. The call processor 202 can identify the caller, email sender, or other source of communication by comparing the identifier with an electronic phone book, corporate directory, or other repository located at the second user phone 14 or computer 16, or an external source, such as a lightweight directory access protocol (LDAP) directory. The call processor 202 can determine collaborative history data corresponding to an identifier by comparing the identifier and metadata or other information tagged at the collaborative history data. For example, in a previous phone call, the callee 14 can access an electronic document at the callee's computer 16. Here, the electronic document can be tagged with the caller's name, phone number, or other identifier. When the callee 14 receives a subsequent phone call from the caller 12, the call processor 202 can retrieve the tagged electronic document by comparing the incoming call information, i.e, caller's name, phone number, or other identifier, to the name, phone number, or other identifier at the tagged electronic document to determine that this document is to be added to search results.

The tag generation module 204 associates the identifier with documents associated with the communication. For example, the tag generation module 204 can generate metadata, header, or other tag indicating that an email message, chat session, file, or other data was opened during a communication between phones 12 and 14. The tag can be used to associate the caller 12 with computer contents that can be retrieved among a list displayed at the receiver's computer 16 during future phone calls received from the caller 12, instead of independently searching for the contents. The call processor 202 can read the tag in a comparison with the identifier to determine whether a data item is to be added to the collaborative history data.

The organization module 208 can parse an email sender and/or recipient's name, voicemail from this number, document author, chat transcripts, other files tagged with the caller's name, and generate a list of items made available to the callee 16, for example, shown in the display screen 600 at FIG. 6.

The storage 210 stores previous caller info, metadata, header information, or the like, which can be processed by the tag generation module 204 and/or the organization module 206.

Figure 3:
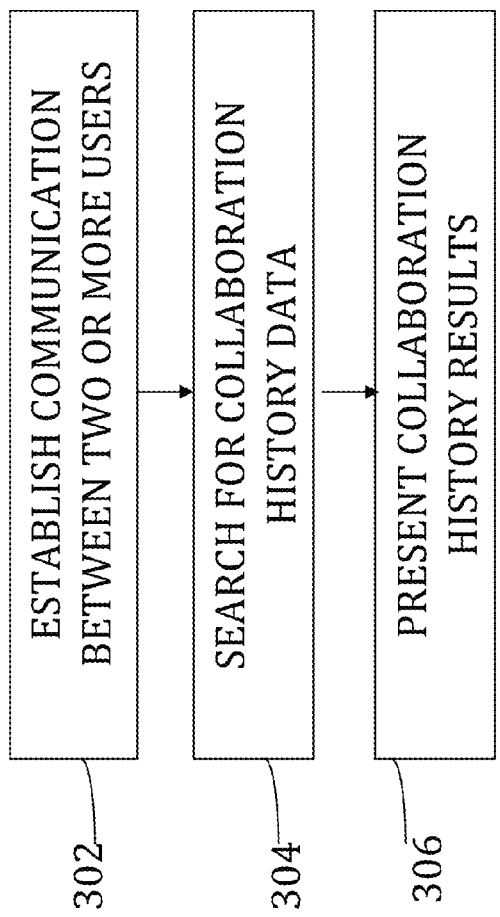
FIG. 3 is a flowchart of a method for providing a unified communication, in accordance with an embodiment.

FIG. 3 is a flowchart of a method 300 for providing a unified communication, in accordance with an embodiment. In describing the method 300, reference is also made to FIGS. 1 and 2. Some or all of the method 300 can be performed on the UC organization system 26. Some or all of the method 300 can be performed at an electronic device 12, 14, 16, and/or 18.

At block 302, a communication is established between two or more electronic devices such as telephones, cell phones, smart phones, and/or computers. The communication can be a phone call, an email message, a text message, or related electronic communication. The communication can be an electronic meeting between two or more participants, for example, a chat room, voice over IP conference, web conference, online discussion forum, or other environment where two or more users participate in an interactive exchange.

The communication can be made to a unified communications phone number, permitting the communication to be received and processed by two or more devices, for example, a desk telephone and a cell phone can ring simultaneously or sequentially. Referring to FIG. 1, the second user phone 14 can receive a call from the first user phone 12. The second user phone 14 is in communication with the second user computer 16, which can generate a notification in response to the phone 14 receiving the call.

At block 304, the receipt by the second user phone 14 of a call from the first user phone 12 can trigger an automatic search at the second user computer 16 for collaborative history data according to an identifier provided with the electronic communication. For example, the identifier can include the calling party ID of the first user phone 12. The collaborative history data can include metadata, a header, or related information corresponding to the first user, for example, the calling party ID, or a caller name and the like. During the search, the received identifier can be compared to the metadata or header information to determine whether a data item was accessed or otherwise associated with a previous communication between the first user and any of the second user devices, i.e., the second user phone 14 and/or the second user computer 16. If a comparison result indicates that a data item is related to a previous communication, for example, a file such as a voicemail message, chat transcript, or email message, then this item is added to a list of items for presentation to the callee, or the second user computer 16.

At block 306, the collaborative history results are presented at the user computer 16.

The method 300 can also apply to the caller, i.e., the first user, who can receive an identifier such as the second user's name, phone number, and the like. The identifier can be used to generate collaborative history data at a computer or other electronic device in communication with the first user phone 14.

Figure 4:
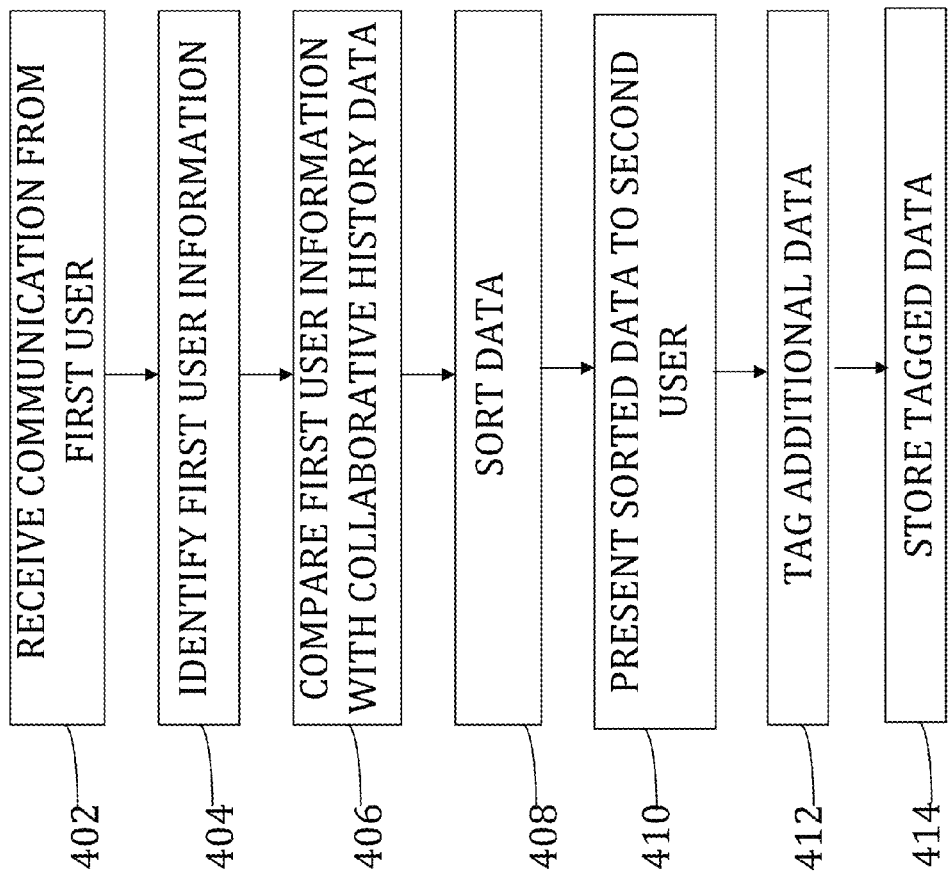
FIG. 4 is a flowchart of a method for sorting and retrieving relevant content related to a unified communication, in accordance with an embodiment.

FIG. 4 is a flowchart of a method 400 for sorting and retrieving relevant content related to a unified communication, in accordance with an embodiment. In describing the method 400, reference is also made to FIGS. 1 and 2. Some or all of the method 400 can be performed on the UC organization system 26. Some or all of the method 400 can be performed at an electronic device 12, 14, 16, and/or 18.

At block 402, the second user can receive a communication from a first user, more specifically, from an electronic device of the first user such as a telephone, cell phone, smart phone, or computer. The communication can be a phone call, an email message, a text message, or other electronic communication. The communication can be made to a unified communications phone number, permitting the communication to be received and processed by two or more devices, for example, a desk telephone and a cell phone can ring simultaneously or sequentially. Referring to FIG. 1, the second user phone 14 can receive a call from the first user phone 12. The second user phone 14 is in communication with the second user computer 16, which can generate a notification in response to the first user phone 14 receiving the call. The second user phone 14 receiving the call can be in communication with the second user computer 16, which can generate a notification in response to the second user phone 16 receiving the call.

At block 404, information corresponding to the first user can be identified by the UC organization system 26. The information can include the first user's name, phone number, email address, or other identifier. The information can be identified by comparing the identifier with information located in an electronic phone book, corporate directory, LDAP directory, or other repository.

At block 406, the first user information is compared with collaborative history data. The collaborative history data can be data accessed, processed, or otherwise used by the second user in previous communications between the first and second users, for example, previously generated emails, text messages, instant messaging sessions, and/or phone calls.

At block 408, the collaborative history data is sorted, for example, processed by the organization module 206 for organization according to chronological order, type of data, for example, files, email messages, voicemail messages, and so on, or according to other user-defined arrangements.

At block 410, the sorted data can be presented to the second user.

At block 412, additional data can be tagged. For example, during a call, any relevant data accessed, used, or otherwise processed at the second user computer can be tagged for addition to the collaborative history data. At block 414, the tagged data can be stored at the storage 408, or other storage device. The data can be retrieved and presented in a future communication between the first and second users in accordance with embodiments described herein.

Figure 5:
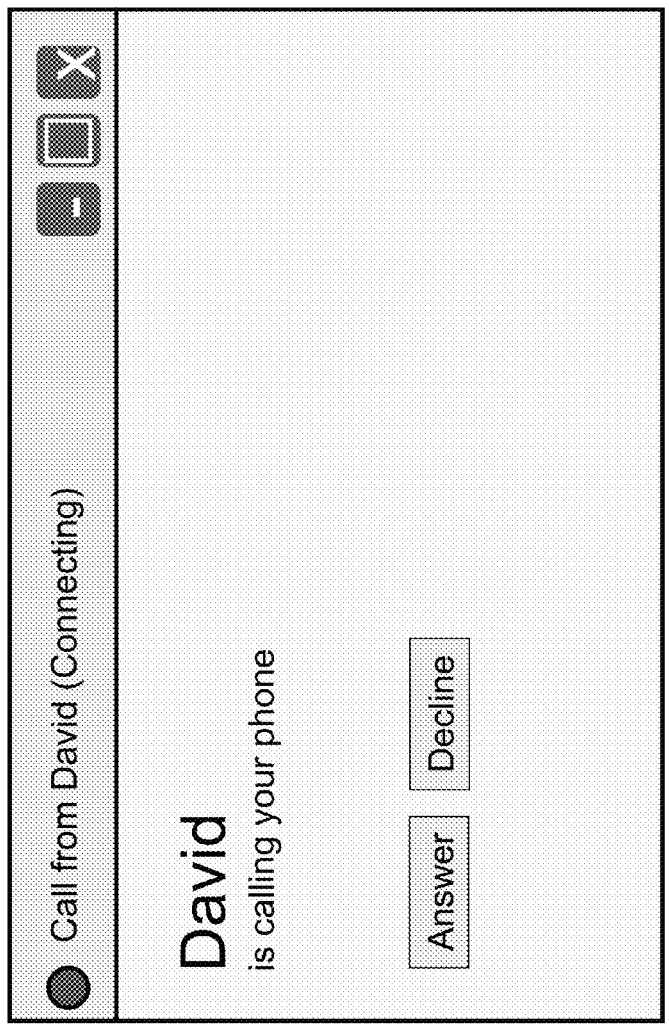
FIG. 5 is a screenshot illustrating a call notification generated at a display screen, in accordance with an embodiment.

FIG. 5 is a screenshot 500 illustrating a call notification generated at a display screen, in accordance with an embodiment. The screenshot 500 refers to a user receiving a call from David, for example, according to block 302 of the method 300 or block 402 of the method 400 described herein. When the user answers the call by selecting the "Answer" button, at least one of the method 300 or the method 400 can be performed.

FIG. 6 is a screenshot 600 illustrating a summary of content displayed at a screen, in accordance with an embodiment. The results shown in FIG. 6 can be displayed in response to the user selecting the "Answer" button shown in FIG. 5. The results can relate to collaborative history data generated during prior and current communications between the user and David.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A device for unified communications, comprising:
 a call processor that processes an identifier received from a communication between a first party electronic device and at least one second party electronic device to determine a set of collaborative history data;
 a tag generation module that associates the identifier with at least one of data related to the communication and the set of collaborative history data, the tag generation module generating a tag for data related to at least one of the first party electronic device and the second party electronic device at least one of before the communication and after the communication, and the tag generation module generating a first tag for another communication having a different identifier than the identifier associated with the at least one of the data related to the communication and the set of collaborative history data, and generating a second tag that associates the at least one of data related to the communication and the set of collaborative history data with a user of a third party electronic device that is different than the first and second party electronic devices, so that the at least one of data related to the communication and the set of collaborative history data is presented in a subsequent communication that includes the user of the third party electronic device; and
 an organization module that generates a list of items made available to at least one of the first party electronic device, the at least one second party electronic device, and the third party electronic device.

2. The device of claim 1, wherein the at least one second party electronic device includes a computer, and wherein the at least one of the data related to the communication and the collaborative history data is presented at the computer.

3. The device of claim 1, wherein data items of the collaborative history data is tagged or untagged at the first party electronic device or the second electronic device.

4. The device of claim 1, wherein the call processor determines the collaborative history data by comparing the identifier and a tag associated with stored data related to previous communications between the first and second party electronic devices.

5. The device of claim 4, wherein the tag includes metadata.

6. The device of claim 1, wherein the collaborate history data is generated from at least one of an email message, a chat session, or a file, or a combination thereof during a previous communication between the first and second party electronic devices.

7. The device of claim 1, further comprising a storage device that stores the collaborative history data and the data related to the communication.

8. A computer program product, comprising:
 a computer readable storage medium having computer readable program code embodied therewith, the computer readable program code comprising:
 computer readable program code configured to process an identifier exchanged as part of an electronic communication session between a first party electronic device and a second party electronic device;
 computer readable program code configured to generate a tag for data related to at least one of the first party electronic device and the second party electronic device at least one of before the communication session and after the communication session, and configured to generate a first tag for another communication having a different identifier than the identifier exchanged during the communication session, and generate a second tag that associates the at least one of data related to the communication and the set of collaborative history data with a user of a third party electronic device that is different than the first and second party electronic devices, so that the at least one of data related to the communication and the set of collaborative history data is presented in a subsequent communication that includes the user of the third party electronic device;

computer readable program code configured to search for collaborative history data at the at least one second party electronic device using the identifier; and computer readable program code configured to present at least one of data related to the electronic communication session and the collaborative history data to at the at least one second party electronic device.

* * * * *